(12) United States Patent
Schroeder et al.

(10) Patent No.: US 12,334,756 B1
(45) Date of Patent: Jun. 17, 2025

(54) EMERGENCY POWER SUPPLYING DEVICE

(71) Applicant: UIPCO, LLC, San Antonio, TX (US)

(72) Inventors: Eric David Schroeder, San Antonio, TX (US); Donnette L. Moncrief Brown, San Antonio, TX (US); Snehal Desai, Richardson, TX (US); Manfred Amann, San Antonio, TX (US); Timothy Frank Davison, San Antonio, TX (US); Rachel Michelle Ballew, San Antonio, TX (US); Kelsey Anne O'Brien, Austin, TX (US); Sayeef Rahim, Allen, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 857 days.

(21) Appl. No.: 17/537,991

(22) Filed: Nov. 30, 2021

(51) Int. Cl.
  *H02J 7/00* (2006.01)
  *H01M 50/204* (2021.01)

(52) U.S. Cl.
  CPC ....... *H02J 7/00047* (2020.01); *H01M 50/204* (2021.01); *H02J 7/0025* (2020.01); *H02J 7/0048* (2020.01)

(58) Field of Classification Search
  CPC ........ H02J 7/00; H02J 7/00047; H02J 7/0048; H01M 50/204
  See application file for complete search history.

(56) References Cited

FOREIGN PATENT DOCUMENTS

DE    102019212462 A1    2/2021

OTHER PUBLICATIONS

Notice of Allowance issued in U.S. Appl. No. 17/850,002, on Nov. 9, 2023.

*Primary Examiner* — Robert L Deberadinis
(74) *Attorney, Agent, or Firm* — Plumsea Law Group, LLC

(57) ABSTRACT

A power supplying device that can be used during emergencies is disclosed. The device comprises multiple adjustable battery compartments that can be connected, via switches, to deliver power to an external device connected to at least one power delivery port of the power supplying device. Each adjustable battery compartment includes a fixed lead and a sliding lead so that the multiple different battery sizes can be inserted into the compartment and connected to the device. The device includes an intelligent power management system that can automatically detect power requirements for the external device as well as the maximum available voltage from any batteries inserted into the adjustable battery compartments. Using this information the intelligent power management system can open switches to provide the required voltage from a selected subset of batteries in the device, while leaving the remaining batteries disconnected.

9 Claims, 15 Drawing Sheets

EMERGENCY POWER SUPPLYING DEVICE

TECHNICAL FIELD

The present disclosure generally relates to power supplying devices, and in particular to power supplying devices that use batteries.

BACKGROUND

During catastrophes and other emergencies, power may be lost so that it becomes difficult to charge electronic devices such as cell phones. Portable charging devices can be charged and used, however, these devices must themselves be charged ahead of any emergencies. Meanwhile, many people have an assortment of extra batteries around their house, which store untapped power that could otherwise be used to charge cell phones during an emergency.

There is a need in the art for a system and method that addresses the shortcomings discussed above.

SUMMARY

In one aspect, a power supplying device includes a plurality of adjustable battery compartments, where each adjustable battery compartment includes a first lead having a fixed location within the adjustable battery compartment and a second lead have an adjustable location within the battery compartment, and where each adjustable battery compartment can accommodate at least two different battery sizes. The power supplying device also includes a power delivery port electrically connected to the plurality of adjustable battery compartments and configured to receive power from one or more batteries placed in the plurality of adjustable battery compartments and a step-down voltage converter configured to convert an input voltage received from the one or more batteries in the plurality of battery compartments to a predetermined output voltage for the power delivery port.

In another aspect, a power supplying device includes a plurality of adjustable battery compartments, where each adjustable battery compartment includes a first lead having a fixed location within the adjustable battery compartment and a second lead having an adjustable location within the battery compartment, where each adjustable battery compartment can accommodate at least two different battery sizes. The power supplying device also includes a power delivery port configured to receive power from one or more batteries placed in the plurality of battery adjustable compartments, where the power delivery port has a standard operating voltage and where each battery compartment in the plurality of adjustable battery compartments includes a corresponding battery compartment switch that can be used to connect and disconnect the leads of the adjustable battery compartments with the power delivery port, and an intelligent power management system. The intelligent power management system is configured to determine that a power consuming device is connected to the power delivery port, sense any batteries in the plurality of adjustable battery compartments, including an available voltage for each sensed battery, select a subset of batteries in the plurality of adjustable battery compartments with a combined voltage at least as large as the standard operating voltage of the power delivery port, and connect, using the corresponding battery compartment switch for each battery compartment, the selected subset of batteries to the power delivery port and disconnect any other batteries compartments.

In another aspect, a power supplying device includes a plurality of adjustable battery compartments, where each adjustable battery compartment includes a first lead having a fixed location within the adjustable battery compartment and a second lead having an adjustable location within the battery compartment, where each adjustable battery compartment can accommodate at least two different battery sizes. Each battery compartment in the plurality of battery compartments can be connected and disconnected from a composite battery circuit by a corresponding switch. The power supplying device further includes a power delivery port configured to receive power from one or more batteries placed in the plurality of battery adjustable compartments, where each battery compartment in the plurality of adjustable battery compartments includes a corresponding battery compartment switch that can be used to connect and disconnect the leads of the adjustable battery compartments with the power delivery port. The power supplying device also includes a display screen and an intelligent power management system. The intelligent power management system is configured to automatically sense a voltage requirement of a powered device connected to the power delivery port, automatically sense any batteries in the plurality of battery compartments, including an available voltage for each sensed battery, determine a maximum available voltage for the composite battery circuit, and display the maximum available voltage on the display screen and display the voltage requirement on the display screen.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

Figure 1:
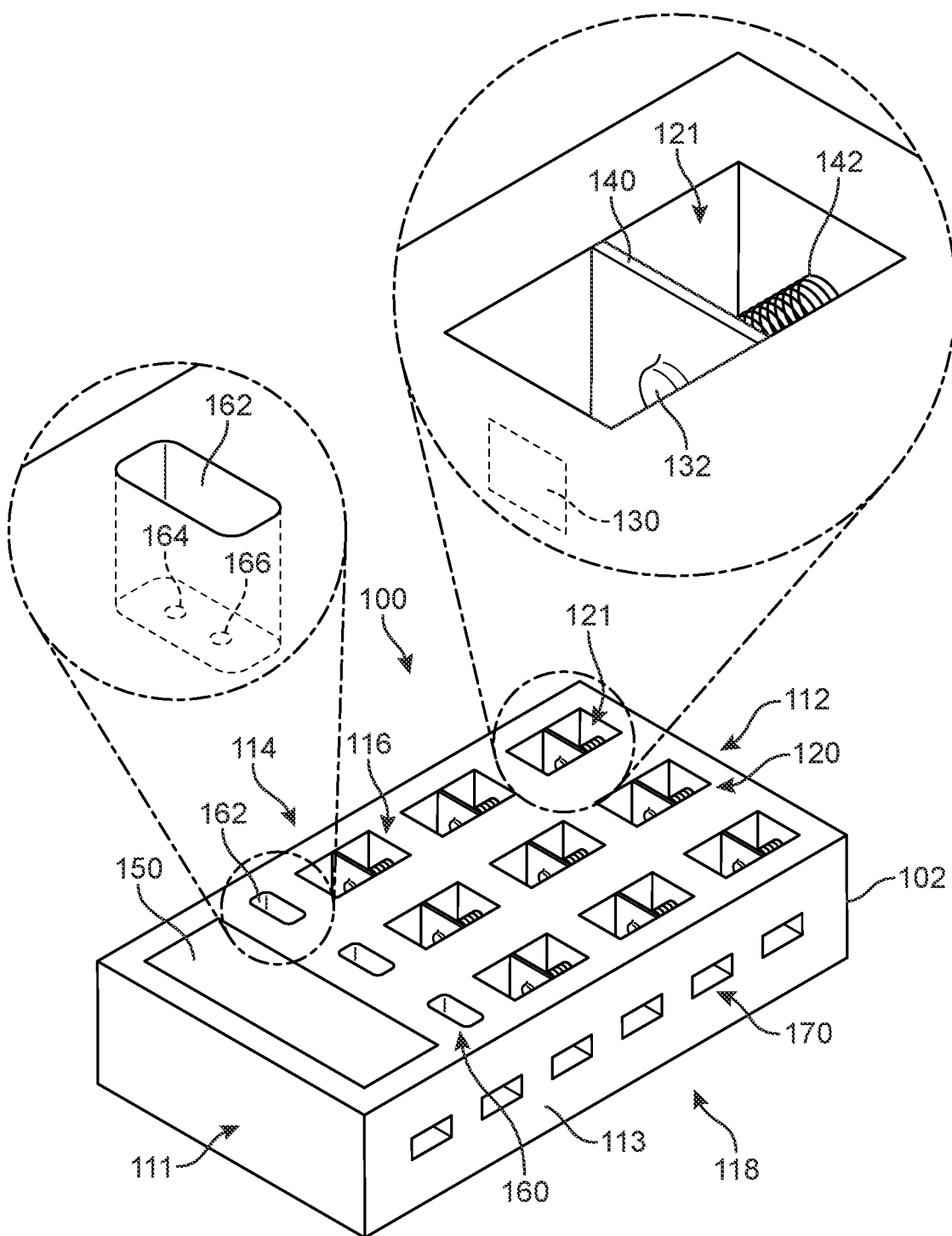
FIG. 1 is a schematic view of power supplying device, according to an embodiment.

The embodiments provide an emergency power supplying device that can be used in emergencies or other scenarios where power is lost within a house or building. In such scenarios, users may not have a power supply that can be used to, for example, charge cell phones and other electronic devices that may be necessary for contacting emergency responders or otherwise sending and receiving information during the emergency. The power supplying device of the embodiments can convert the untapped power of standard batteries that a user may have lying around in their house or place of business into a power source that can be used to charge devices such as cell phones. Moreover, the power supplying device uses battery compartments that are adjustable to accommodate different battery sizes, thereby allowing users to insert many different kinds of batteries into the device for drawing power. This features allows the power supplying device with an assortment of different batteries that a user may have in their home, rather than relying on the user having a sufficient number of batteries of one particular size.

To accommodate multiple different battery sizes, each adjustable battery compartment includes a fixed lead and a sliding lead. The position of the sliding lead can be adjusted and biased to accommodate smaller batteries using a spring.

To provide an appropriate amount of voltage for powering an external device, the device can be configured with electrical switches that can be used to independently connect and disconnect each battery compartment to one or more power delivery ports, as well as an intelligent power management system that intelligently controls the switching based on sensed information and optional power delivery settings. The intelligent power management system can adapt to different power requirements as different devices are plugged in. The system can also adapt to changes in voltage as one or more batteries are drained to ensure that a sufficient voltage is provided at all times.

To facilitate ease of use, the power supplying device may include a display screen that can be used to show users available power from one or more batteries as well as power requirement for any devices connected to the power delivery port(s). The messages can also instruct users to add additional batteries when there is insufficient voltage to power a connected device.

The intelligent power management system can operate in different power delivery modes, such as a "full drain" mode, a "fast charge" mode, and a "cost savings" mode. Using different modes, the system may change the power delivery configuration (that is, which batteries are connected to the output ports) to accommodate user preferences such as draining the lower capacity batteries before drawing power from batteries that have greater capacity.

For purposes of description, the term "battery" refers to any component that provides a source of electrical power, which includes one or more electrochemical cells and external power connections (for example, a positive terminal and a negative terminal). Batteries can comprise primary use batteries ("disposable" batteries) or secondary batteries ("rechargeable" batteries). Examples of primary batteries include alkaline batteries, while examples of secondary batteries include lead-acid batteries and lithium-ion batteries.

Batteries may come in different form factors. Moreover, different form factors may provide standardized power requirements (that is, voltage and amperage). Exemplary form factors include "AAA", "AA", "C", "D", and "9 Volt" batteries. In this case, each of these batteries has a nominal voltage of 1.5 Volts ("1.5 V"), except for the "9 Volt" battery which has a nominal voltage of 9 V. These different form facts have varying sizes and different typical current capacities ranging from 1000 milli-amp hours ("1000 mAh") for AAA batteries, to 13,000 mAh for D batteries. Of course, these are only intended to be exemplary, and there are many other standardized battery form factors with standard power requirements.

Additionally, rechargeable batteries including lead-acid batteries and lithium-ion batteries can also be manufactured with predetermined form factors and power requirements.

As used herein, the term "power consuming device" refers to any device that can draw power from a power source. Power consuming devices may be battery free, or may include batteries. In some cases, power consuming devices draw power from a power source in order to recharge onboard batteries. For example, a cell phone (or smart phone) may be considered a power consuming device that draws power from a power supply for the purpose of recharging its own lithium-ion batteries. For purposes of the present disclosure, power consuming (or power drawing) devices are those that are connected to a power supplying device of some kind with the purpose of drawing power from the power supplying device.

FIG. 1 is a schematic view of an emergency power supplying device 100 ("device 100"), which is configured to receive power from one or more batteries and deliver the received power to one or more other devices.

Device 100 may be used in a variety of scenarios. For example, device 100 may be used during emergency situations in which there is a power outage so that users cannot charge cell phones, tablets, or other electronic devices through wall outlets. In these scenarios, device 100 can be used to charge one or more power consuming devices (such as cell phones) provided the user has one or more batteries that can be connected to device 100. As described in further detail below, device 100 is configured so that a user can insert multiple batteries into device 100, such that the cumulative power of those batteries can be used to charge one or more power consuming devices through standard charging ports (such as USB, USB-C, micro-USB, and lighting ports).

By contrast with existing devices, device 100 is designed so that a user can connect batteries of different types (form factors), and the power from the different batteries can be combined to supply sufficient power for charging, for example, cell phones or tablets. Device 100 may specifically receive a variety of different standard battery types (such as "AAA", "AA", "C", "D", and "9 Volt"), as well as other suitable battery types. Device 100 can also include ports that allow power to be drawn from laptop batteries, vehicle batteries, or other suitable batteries.

Device 100 includes a body 102. In an exemplary embodiment, body 102 has a generally box-like geometry, including front wall 111, rear wall 112, first side wall 113, and second side wall 114. Also, a top side 116 and a bottom side 118. In other embodiments, body 102 could have any other suitable geometry.

Top side 116 includes a includes a plurality of adjustable battery compartments 120. Each battery compartment is comprised of an opening or cavity sufficient to receive batteries less than or equal to a predetermined size. For example, in the embodiment shown in FIGS. 1-2, each adjustable battery compartment is suitably sized so that batteries having any one of the sizes AAA, AA, C, or D can fit. In other embodiments, the size and geometry of each compartment could vary to accommodate other standard battery sizes.

Each compartment is further configured with a fixed terminal and a sliding terminal. An exemplary first battery compartment 121 includes a fixed lead 130 and a sliding lead 132. Sliding lead 132 is disposed on a slidable member 140, which may be biased by a spring 142.

Figure 2:
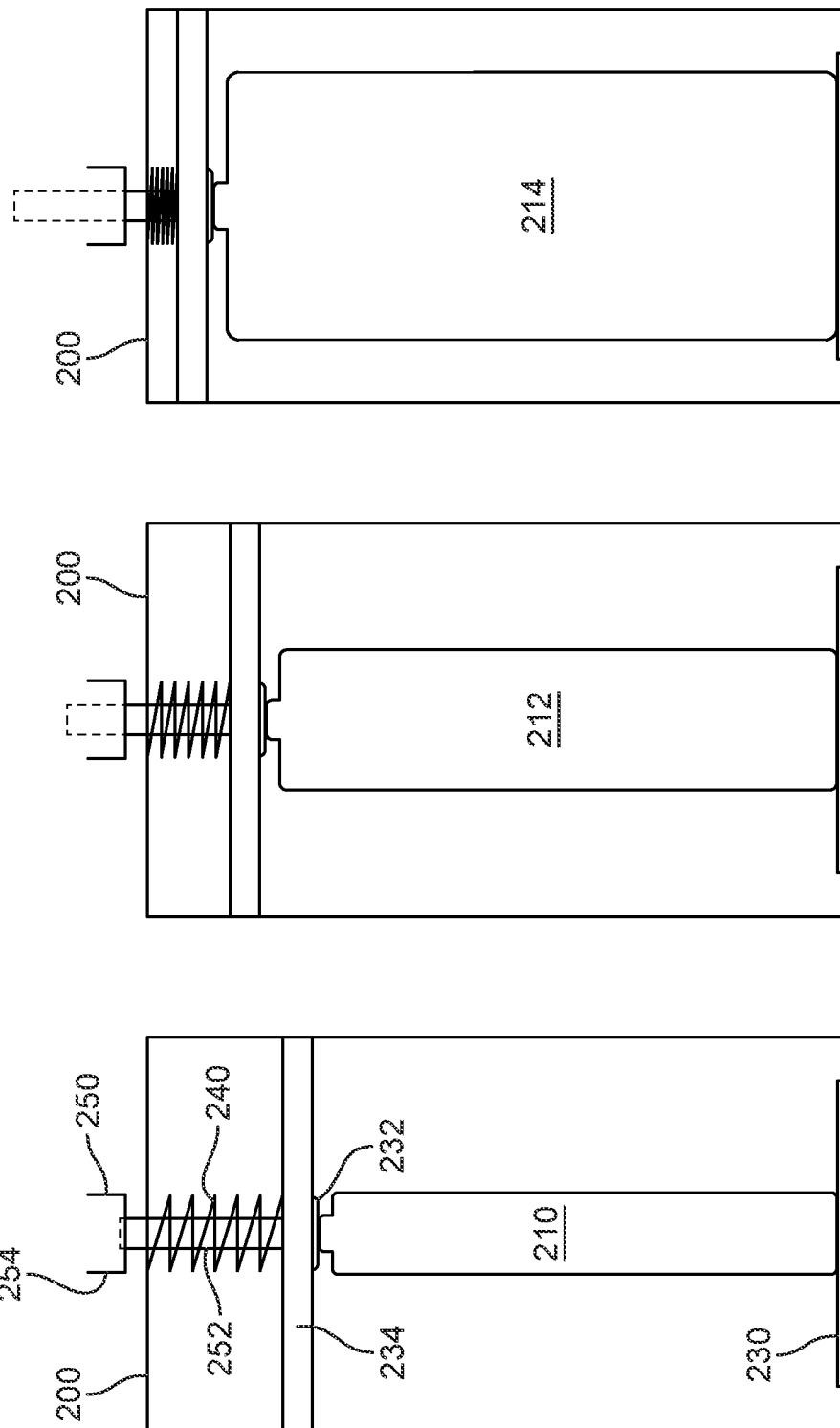
FIG. 2 is a schematic view of different positions for a battery compartment, according to an embodiment.

FIG. 2 shows how the same battery compartment 200 can receive batteries of three different sizes, as slidable divider 202 can be moved to increase the available opening size. Specifically, in this example, battery compartment 200 can hold a AAA battery 210, a AA battery 212, and a D battery 214. Additionally, a C battery, which has a size between a AA and D battery, could be placed within the compartment. Each battery is positioned so that that battery's terminals come into contact with fixed lead 230 and sliding lead 232, thereby creating a circuit from which power can be drawn from the battery. It may be appreciated that each lead is further connected to a portion of an internal circuit (not shown).

Some embodiments may also include position sensors that can determine the position of the sliding lead within an adjustable battery compartment. The position of the sliding lead can be used to determine the length of the inserted battery, which can further be used to determine the battery type. In the example shown in FIG. 2, a linear position sensor 250 is used to determine the relative position of sliding lead 232 within battery compartment 200. Here, position sensor 250 includes an actuating element 252 that slides into a body portion 254 as sliding lead 232 is moved away from fixed lead 230 (and as spring 240 is compressed). In the embodiment of FIG. 2, sensor 250 is coaxial with spring 240. In other embodiments, sensor 250 could be disposed away from spring 240 with actuating element 252 contacting another part of slidable member 234.

Referring back to FIG. 1, to accommodate batteries with two terminals on a single end, such as 9 Volt batteries, the embodiments can include one or more fixed battery compartments 160. For example, a fixed battery compartment 162 can be sized to fit a 9 Volt battery. Moreover, fixed battery compartment 162 can be configured with a first fixed lead 164 and a second fixed lead 166 along the bottom of the compartment, which are sized and positioned to engage with corresponding terminals on a 9 Volt battery.

Plurality of adjustable battery compartments 120 and plurality of fixed battery compartments 160 may be wired together into a common circuit so that power from two or more batteries placed within battery compartments 120 and/or battery compartments 160 can be combined to deliver power to power delivery port, which is further connected to a power consuming device. Various ways of combining two or more batteries are described in further detail below.

Body 102 of device 100 may also have a display screen 150 ("display 150"). In this example, display 150 is disposed on top side 116, however in other embodiments the top side could be disposed on any other side or wall of the device. Display 150 could be any suitable kind of display (for example, LCD or LED), and may display various information for a user, as described in further detail below.

Device 100 may include one or more ports 170. For purposes of illustration, ports 170 are shown generically in FIG. 1. However, as described in further detail below, device 100 can be configured with a variety of different kinds of electrical ports and connections, which can facilitate both delivering power to external power consuming devices as well as drawing power from external devices (such as car batteries and laptop batteries, which cannot be placed within the battery compartments). In one embodiment, device 100 may include a set of power delivery ports on one side (such as first sidewall 113) and a set of power drawing ports one another side (such as second sidewall 114).

The dimensions of device 100 may be configured to balance portability/usability with the desire to provide a sufficient number of battery compartments, as well as ports, and a suitable display. In one embodiment, device 100 may have the approximate size of a large book. As an example, device 100 could have a length substantially between 8 inches and 12 inches in length, a width substantially between 6 inches and 10 inches in width, and a depth substantially between 2 inches and 4 inches. Of course, the embodiments are not intended to be limited to these exemplary sizes and device 100 could be configured with larger or smaller dimensions according to desired features such as portability and intended uses.

In the embodiment of FIG. 1, device 100 includes nine adjustable battery compartments and three fixed battery compartments. However, in other embodiments, any suitable number of adjustable and/or fixed battery compartments could be used. Because many small personal electronic devices, such as cell phones, require 5 Volts for charging, and since many standard non-rechargeable batteries provide 1.5 Volts of power, embodiments of device 100 may include at least four adjustable battery compartments to meet these minimum charging requirements.

Figure 3:
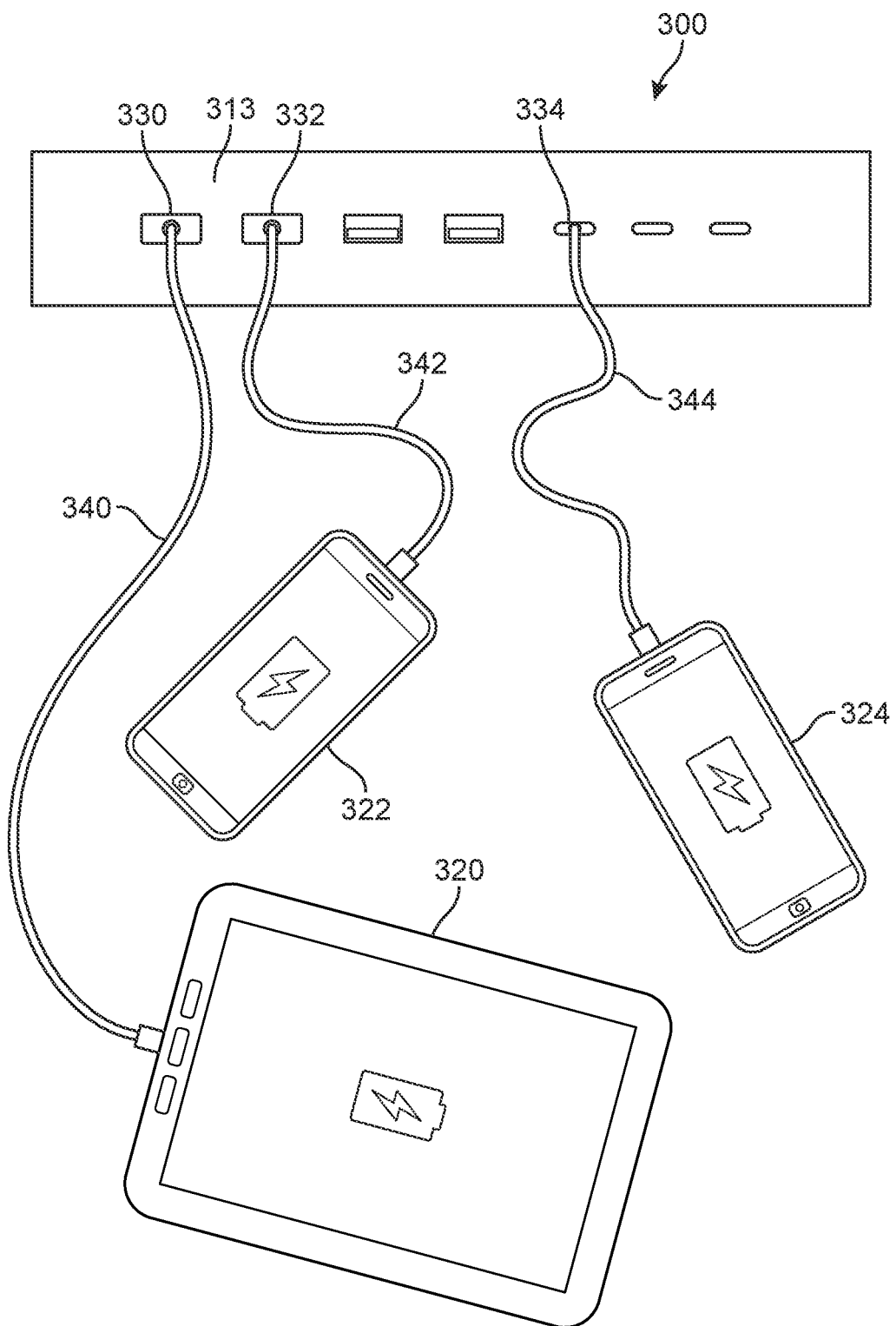
FIG. 3 is a schematic view of a side of a power supplying device with multiple power delivery ports, according to an embodiment.

FIG. 3 is a schematic view of one embodiment of a first sidewall 313 of another embodiment of a power supplying device 300, which may include multiple different kinds of power delivery ports. In this embodiment, first sidewall 313 includes a set of power delivery ports 302. These could include, for example, USB ports 310 and USB-C ports 312. In other embodiments, any other suitable ports that are used to connect external devices to power sources could be used.

In FIG. 3, multiple devices are connected to power delivery ports in order to provide these devices with the power needed for recharging. In this example, a tablet device 320 is connected to a first USB port 330 using a first power cord 340. In addition, a first cell phone 322 is connected to a second USB port 332 using a second power cord 342. Additionally, a second cell phone 324 is connected to a USB-C port 334 using a third power cord 344.

Each power delivery port may be configured to supply a particular output voltage and maximum current draw, according to standards for the type of port. For example, standard USB ports may operate with an output voltage of 5 Volts and a maximum current draw of 500 milli-Amps (500 mA). Some connection types, such as USB-C are capable of delivering different voltages, but can be configured for a predetermined value, such as 5 Volts.

It may be appreciated that these devices may all be charged only when there is sufficient power available from batteries connected to the power supplying device. In some embodiments, a power supplying device can include provisions for moderating the supply of power to different devices whenever two or more devices are plugged in to draw power.

Figure 4:
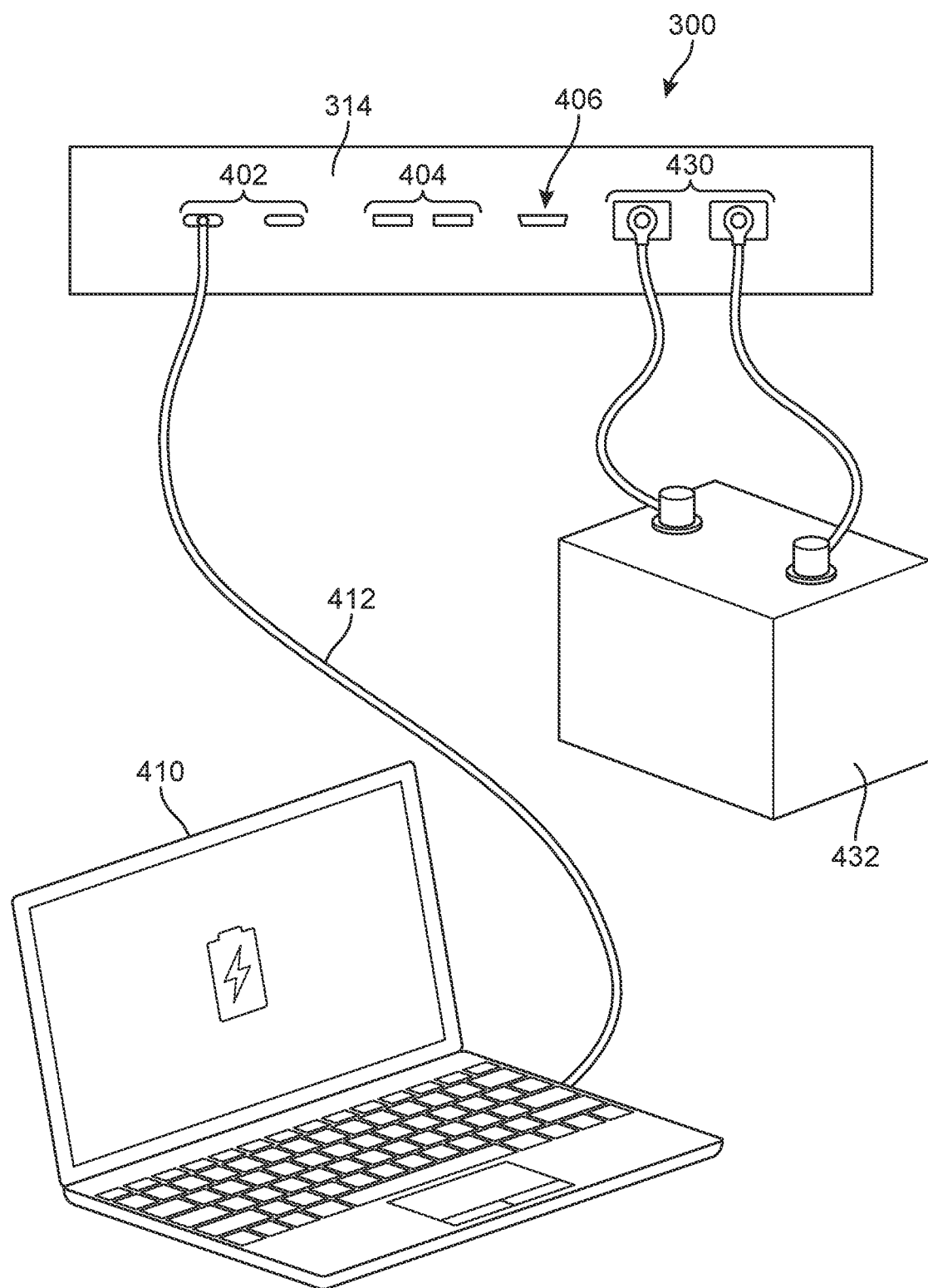
FIG. 4 is a schematic view of a side of a power supplying device with multiple power receiving ports, according to an embodiment.

In some cases, a power supplying device may include power drawing ports on a side of the device. FIG. 4 is a schematic view of second sidewall 314 of device 300, which includes a plurality of different power drawing ports that allow a user to connect non-standard batteries to device 100. For example, some embodiments can include USB-C ports 402, lighting ports 404 and micro-USB port 406. In this example, a laptop computer 410 is connected to a first USB-C port via power cord 412. This allows device 100 to draw power from an internal battery of laptop computer 410.

A device may also be configured with positive and negative terminals that can be connected to secondary battery types such as car batteries. In FIG. 4, device 300 includes a pair of electrical connectors 430 that can be connected with corresponding terminals on a car battery 432, so that device 100 can draw power from car battery 432.

Figure 5:
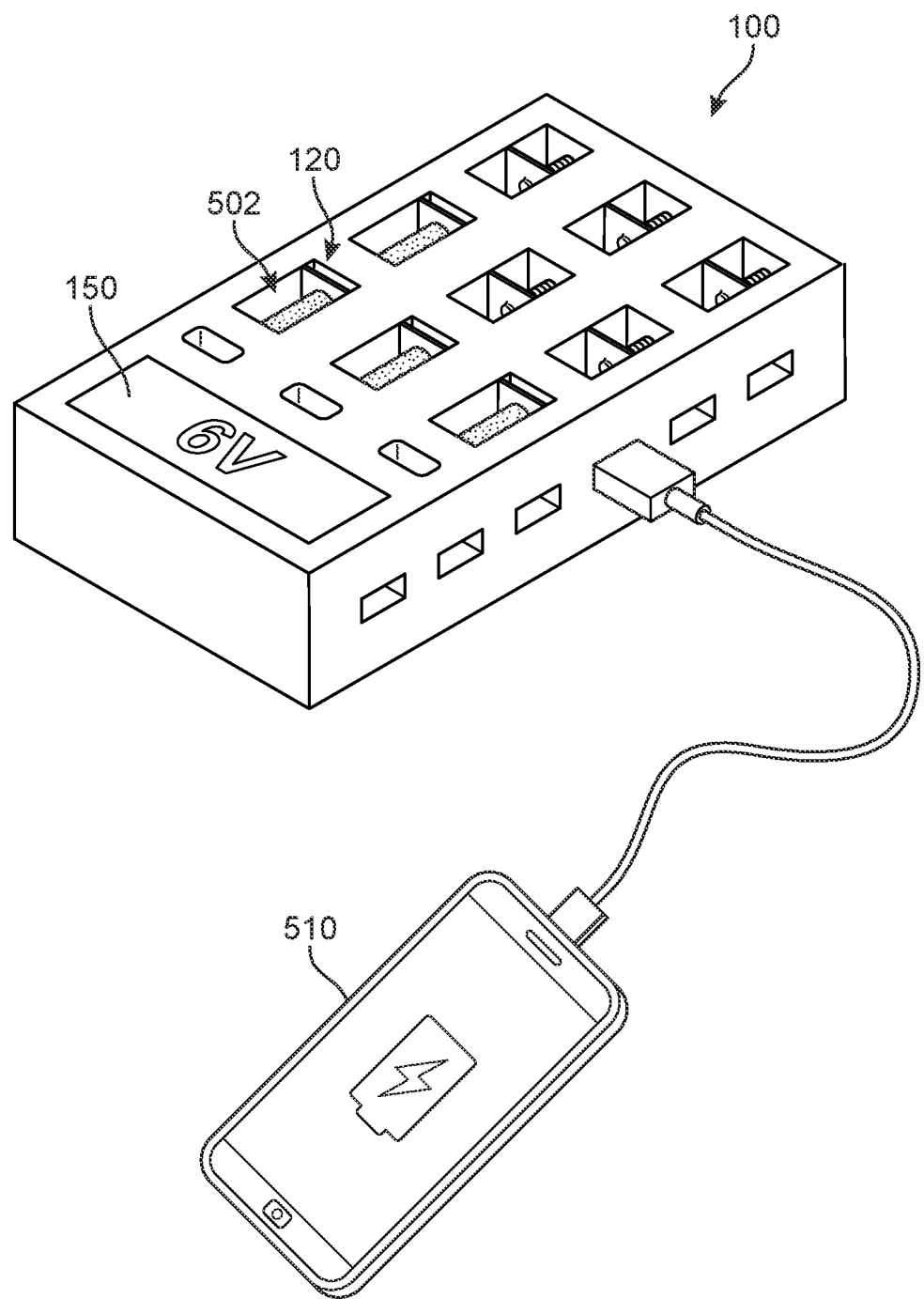
FIG. 5 is a schematic view of a power supplying device being used to charge a cell phone, according to an embodiment.

FIG. 5 is an example showing how device 100 can deliver power from four AA batteries and use that power to charge an external device (a cell phone). In this example, a user has inserted four AA batteries 502 into four of the battery compartments of device 100. As each AA battery provides approximately 1.5 Volts, the four batteries taken together can provide 6 Volts. This voltage is sufficient to charge a cell phone 510, which generally requires approximately 5 Volts for charging.

The amount of current drawn from a power supplying device may vary for different devices. So long as the batteries inserted within device 100 can accommodate the current draw of the connected device, device 100 can provide power to the connected device. For typical consumer electronic devices, such as cell phones and tablets, the current draw is relatively low and can be accommodated by primary batteries such as AAA, AA, C, and D batteries. However, the current draw may not be as high as would be achieved using a standard wall charger, and so, for instance, charging cell phone batteries may take longer using the exemplary device than using a wall charger. Moreover, the amount of charge achievable using device 100 may depend on the capacity of the batteries inserted into device 100.

For purposes of convenience, the term "battery bank" is used to refer to a collection of two or more batteries, as well as the relevant circuit components, that allow the two or more batteries to be connected and used as a single power source. Thus, the four AA batteries 502 of FIG. 5, together with the internal circuitry of device 100 that connects these batteries into a composite power source for delivering power, comprise a battery bank. The battery bank then supplies power to one or more power delivery ports of the power supplying device. In this example, the battery bank supplies 6 Volts for charging cell phone 510.

As seen in FIG. 5, display 150 shows the available voltage for charging (6 Volts). This allows a user to quickly see how many Volts are available for charging devices. As described in further detail below, display 150 can be used to display various other kinds of information that may help users in deciding how many, or which, batteries to add to provide the necessary power.

In this example, cell phone 510 may be capable of recharging with 6 Volts supplied, which is 1 Volt more than the required 5 Volts. That is, the range of operating voltages of cell phone 510 may include 6 Volts. However, in other embodiments, as described in further detail below, device 100 may be configured with one or more step-down converters that can step down a higher voltage to a lower voltage that is compatible with a given power consuming device. It may be appreciated that depending on the capacity of the batteries and the power requirements of the cell phone, it may also be possible to charge a cell phone requiring 5 Volts using only three AA batteries, which provide a maximum available voltage of 4.5 Volts. Over time, as the capacity of a battery decreases, the supplied voltage drops below the nominal voltage. Therefore, the number of batteries required to charge a power consuming device may be dependent on the capacity of each battery.

Figure 6:
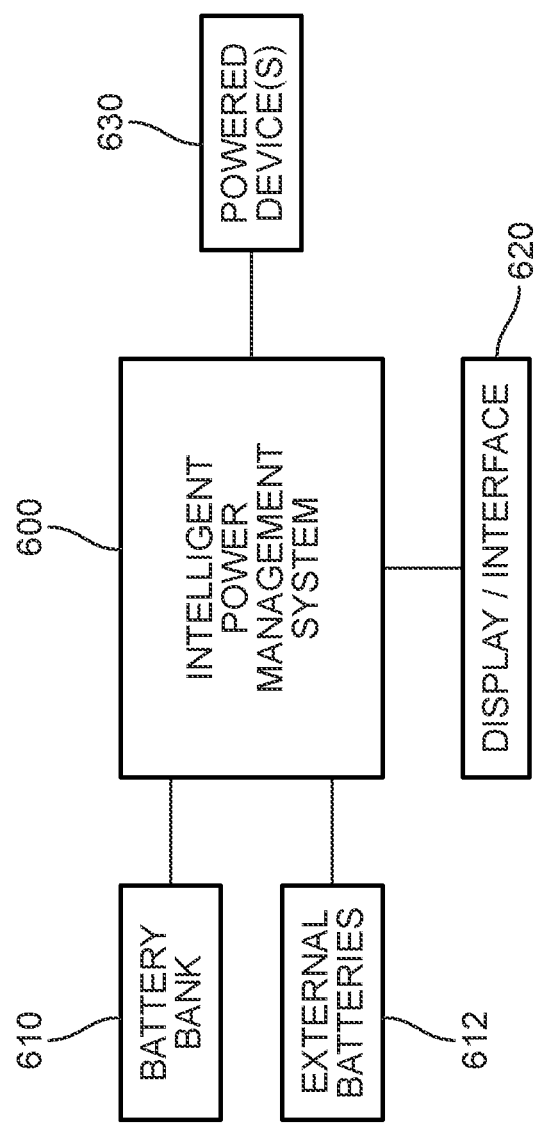
FIG. 6 is a schematic view of a configuration of components associated with a power supplying device, according to an embodiment.

FIG. 6 shows components connected to an intelligent power management system 600 ("system 600"). In some cases, system 600 may be incorporated into power supplying device (such as device 100). System 600 may be connected to a battery bank 610. Specifically, battery bank 610 may be comprised of all the batteries connected to battery compartments within a power supplying device. System 600 may also be connected to one or more external batteries 612. These external batteries are batteries that do not fit into the battery compartments of the associated power supplying device. In an exemplary embodiment, external batteries may be connected using one or more power receiving ports.

As seen in FIG. 6, system 600 can also be connected to a display 620. In some embodiments, display 620 may also provide an interface for users to adjust settings or provide general input, as discussed below. For example, display 620 could be a touch screen. In other cases, a separate interface for providing input could be used. Such interfaces may include buttons, dials, or other kinds of input components.

System 600 also connects to one or more powered devices 630. In a power supplying device, such as device 100, these connections are made via one of the power delivery ports of the device.

System 600 may include various modules and components that facilitate how power is drawn from power sources (including battery bank 610 and external batteries 612) and delivered to one or more powered devices 630. These can include switches, various other circuit elements, and components for managing the switches or other circuit elements.

Figure 7:
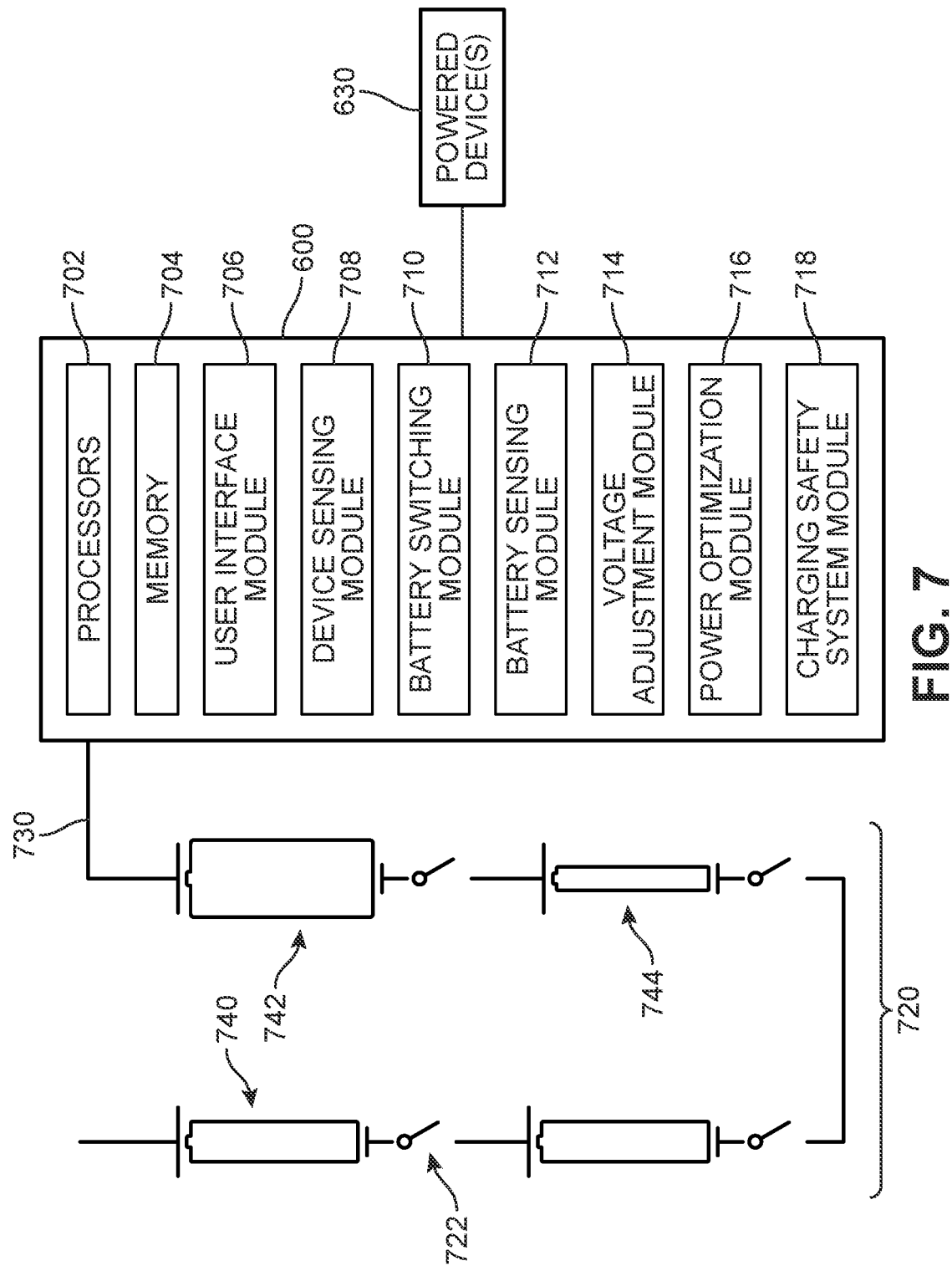
FIG. 7 is a schematic view of an intelligent power management system, according to an embodiment.

Referring now to FIG. 7, intelligent power management system 600 may be provided with various modules that implement the desired functionality for a power supplying device, such as device 100. Specifically, system 600 can include modules that can detect power requirements of power consuming devices (powered devices 630) and modify how power is drawn and used from one or more power sources (for example, from battery bank 720).

For purposes of illustration, a battery bank 720 comprised of just four batteries and related circuit components are shown as a power source. Battery bank 720 includes two AA batteries 740, a C battery 742 and a AAA battery 744.

To regulate how power is drawn from one or more batteries in circuit 720, circuit 720 may include one or more switches 722. In this example, each battery compartment may be associated with a unique corresponding switch that allows the leads of the corresponding battery compartment to be electrically connected or disconnected from circuit 720. More specifically, by providing a separate switch for each battery compartment, each battery compartment can be independently connected or disconnected from a circuit delivering power to power delivery ports.

For purposes of illustration, circuit 720 is shown schematically and is not necessarily intended to represent an accurate arrangement of components. To use the combined voltage of two or more batteries, the battery compartments should be connected in series. However, the circuit should be constructed so that there is still a current flow through the circuit even when (a) the switch for a particular battery compartment is open and/or (b) there is no battery present in a given compartment. Any suitable circuit could be used to achieve these features. For example, the circuit could be designed so that the when the switches are open, the current bypasses the battery compartment, such that the no power is drawn from the corresponding battery. Also, the system may automatically detect the presence of absence of batteries in a compartment (using, for example, information from a linear position sensor that detects the position of the sliding lead in the battery compartment). The system may automatically keep the switches open for all battery compartments without batteries, again insuring the current bypasses the compartment.

In some embodiments, system 600 includes one or more processors 702. System 600 may also include memory 704 that can store instructions executable by the processors.

It may be appreciated that some of the modules described herein may be implemented as hardware modules, or physical circuits, that do not require the use of processors and/or memory. Other modules may be implemented as software running on the processors. Still other modules may be configured as a combination of hardware and software components.

User interface module 706 provides the functionality necessary for displaying information on a display screen of a power supplying device. In some cases, this includes any processors and/or memory necessary to retrieve, store, and display information. Additionally, user interface module 710 may include hardware and software allowing a user to enter input via a touch screen and/or physical buttons of a device.

Device sensing module 708 may be used to sense the presence of one or more power consuming devices connected to any of the power delivery ports, for example, by detecting current through the power delivery ports. Each type of port may be configured with standardized power requirements (an operating voltage and maximum current), and these standard values can be stored in memory 704 and retrieved by device sensing module 708 in order to determine the power requirements for the port (and thus, the expected power requirements of the connected power consuming device).

To facilitate control of these switches, system 600 can include a battery switching module 710. In one embodiment, switches 722 can be opened and closed via commands sent by battery switching module 710.

A battery sensing module 712 may be used to sense the presence and type of batteries within each battery compartment (or of external batteries connected to the device). In some cases, the type of battery can be determined according to the size of the battery (for example, the length of the battery). A linear position sensor could be used to detect the position of a sliding terminal, as different battery types will push the sliding terminal to different positions. Battery sensing module 712 can also detect the operating voltage of each battery (as opposed to the nominal voltage). In some cases, this could be done using Volt metering sensors at each battery compartment.

System 600 can include a voltage adjustment module 714. Module 714 can be used to detect a total supplied voltage from a battery bank and/or external batteries. Module 714 can also be used to step-down the supplied voltage to match the operating voltage of one or more powered devices. For example, if a battery bank is configured so that it will deliver 10 Volts, but the powered device connected to draw power is intended to operate at 5 Volts, module 714 could automatically step-down the voltage from 10 Volts to approximately 5 Volts. Module 714 could be implemented, in part, using any suitable step-down voltage converter. In some embodiments, the converter could be configured to provide a fixed output voltage for a range of input voltages. In other embodiments, the converter could be configured to provide a variable output voltage for a range of input voltages, where the variable output setting could be controlled by module 714 itself.

System 600 can include a power optimization module 716. Power optimization module 716 may be used to determine an optimal power delivery configuration subject to one or more constraints. As used herein, the term "power delivery configuration" refers to a specific collection of settings or operating parameters for a power supplying device. These settings may include the state (on/off) of each switch for each of the battery compartments. For different power delivery configurations, power may be drawn from different batteries inserted within the device. Using different power delivery configurations, the system can adjust (down) the voltage supplied to powered devices.

Having determined an optimal power delivery configuration, power optimization module 716 can send commands to other modules of system 600 to, for example, open and/or close various battery compartment switches. In some cases, as discussed below, power optimization module 716 may have variable power optimization settings that can be adjusted by a user.

System 600 may include a charging safety module 718. Charging safety module 718 may be configured to automatically turn off device 100 and/or disconnect a power delivery circuit from a powered device if the voltage and/or amperage provided by device 100 is determined to exceed threshold operating parameters. Thus, charging safety module 718 may act as a failsafe module that cuts the supplied power to zero anytime it is triggered.

The exemplary power supplying device is designed to be user-friendly. Because many users may not understand how many batteries of a given battery type might be needed to power a given device (such as a cell phone), the device is configured so that a user can insert whatever batteries they happen to have lying around into the device. The device will automatically adapt how power is delivered to the powered devices in a manner that meets the power requirements of those devices and also meets other criteria, such as the power optimization setting.

Moreover, different power delivery configurations can be used to change which batteries are used as power sources for a given device in order to meet some constraint (such as drawing power from the batteries with the lowest charge first).

Figure 8:
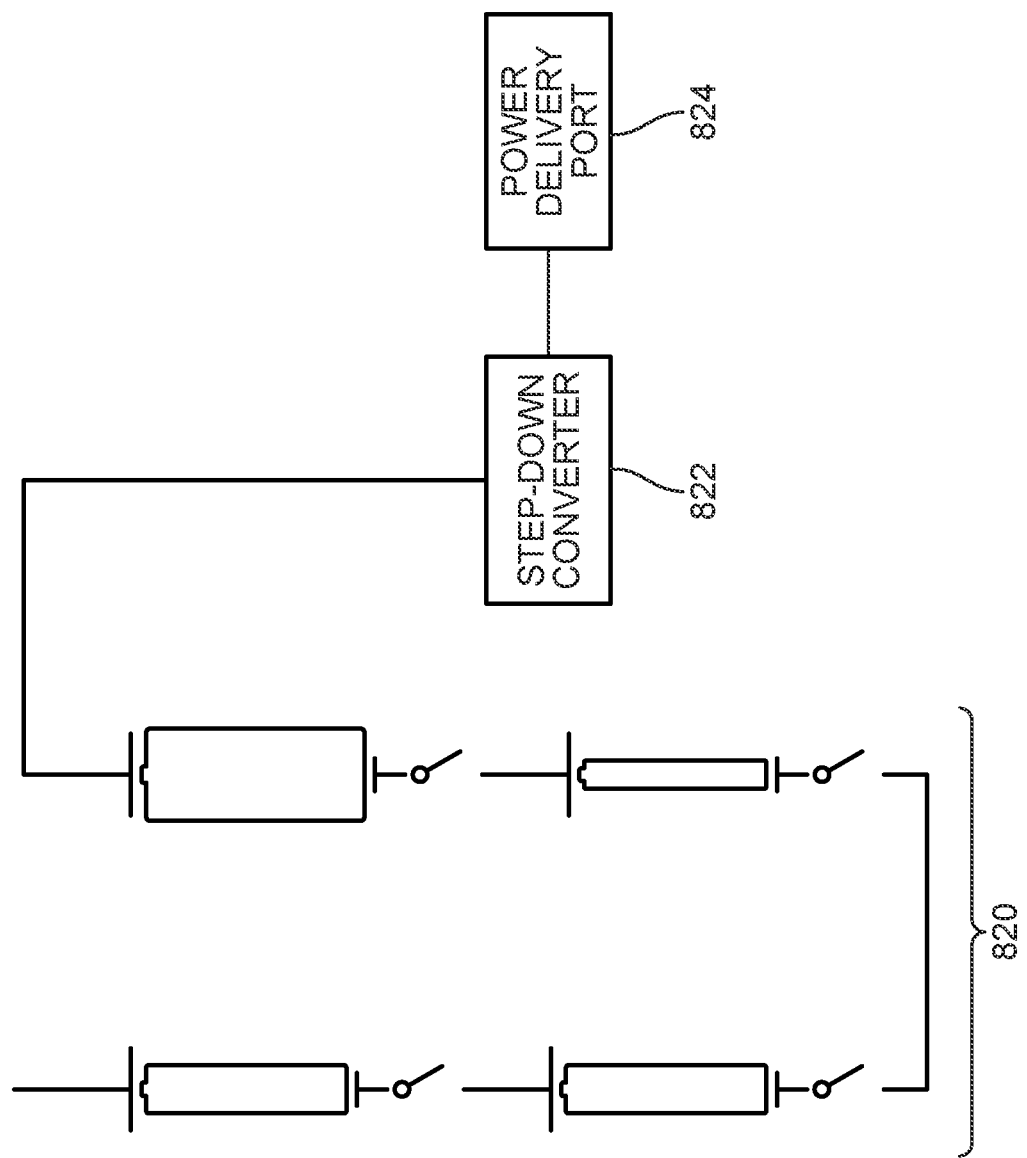
FIG. 8 is a schematic view of a simplified configuration for delivering power using a power supplying device, according to an embodiment.

FIG. 8 is a schematic view of one embodiment of a circuit for a power supplying device. In this embodiment, the four batteries inserted into battery compartments each provide 1.5 Volts. The total available voltage of 6 Volts is supplied to a step-down converter 822 (which may be a stand-alone component or integrated into a voltage adjustment module). The stepped-down voltage supplies power delivery port 824 with the standard 5 Volts expected by the devices that would be plugged into port 824. In other embodiments, this same configuration could be used with any number of batteries, using a step-down converter that can take in variable voltages and output a fixed voltage (such as 5 Volts). A step-down converter could be used in conjunction with one or more switches so that a power supplying device could disconnect some batteries inserted within the device and also step-down the voltage supplied by the remaining batteries that are still connected to the power delivery port.

Figure 9:
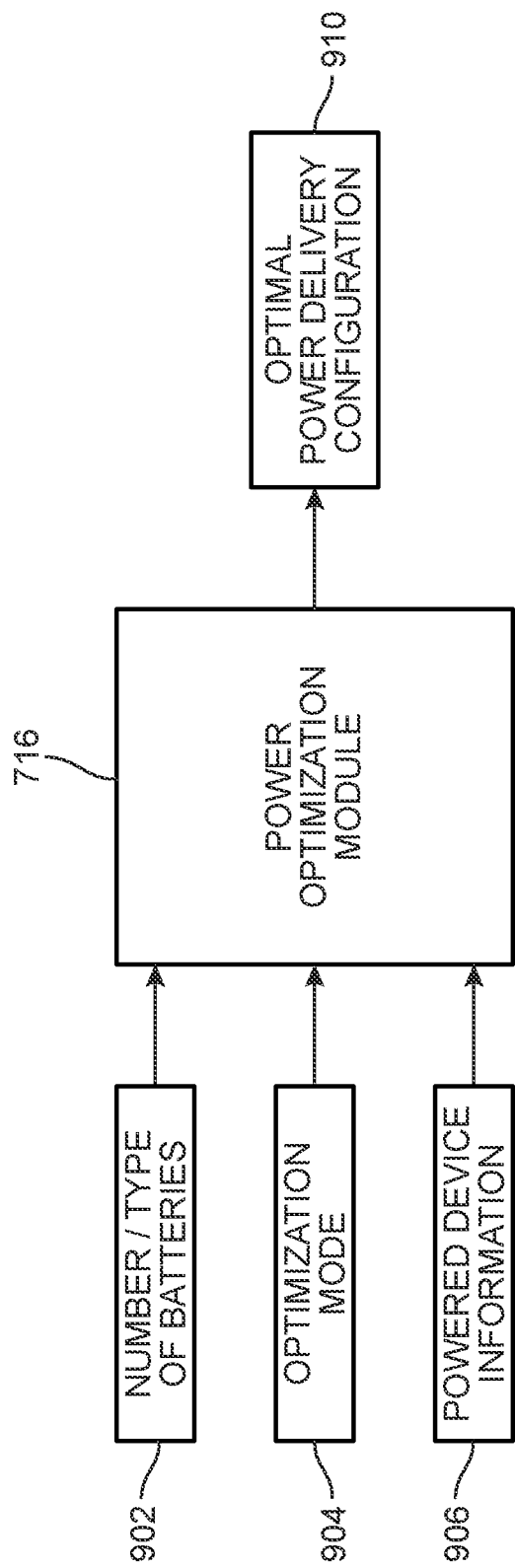
FIG. 9 is a schematic view of a power optimization module, including inputs and outputs, according to an embodiment.

FIG. 9 is a schematic view of inputs and outputs for power optimization module 716. Power optimization module 716 may be used to determine an optimal power delivery configuration 910. The particular power delivery configuration determined by power optimization module 716 can then be implemented using other modules of intelligent power management system 600, such as using battery switching module 710 to open and close various switches according to the selected power delivery configuration.

Inputs to power optimization module 716 can include the number and/or type of batteries inserted within a device (first input 902), an optimization mode (second input 904) and information about any powered devices (third input 906). The number and/or type of batteries can be determined using battery sensing module 712. In addition, in some cases, the measured operating voltage for each sensed battery can be determined. The optimization mode can be received from a user through user interface module 706. Powered device information can be retrieved from device sensing module 708. In some cases, information about powered devices may include that a device is connected to a particular port and the power requirements for that port.

For purposes of clarity, several different optimization modes are described and shown in the Figures. However, the embodiments are not limited to these particular optimization modes.

Figure 10:
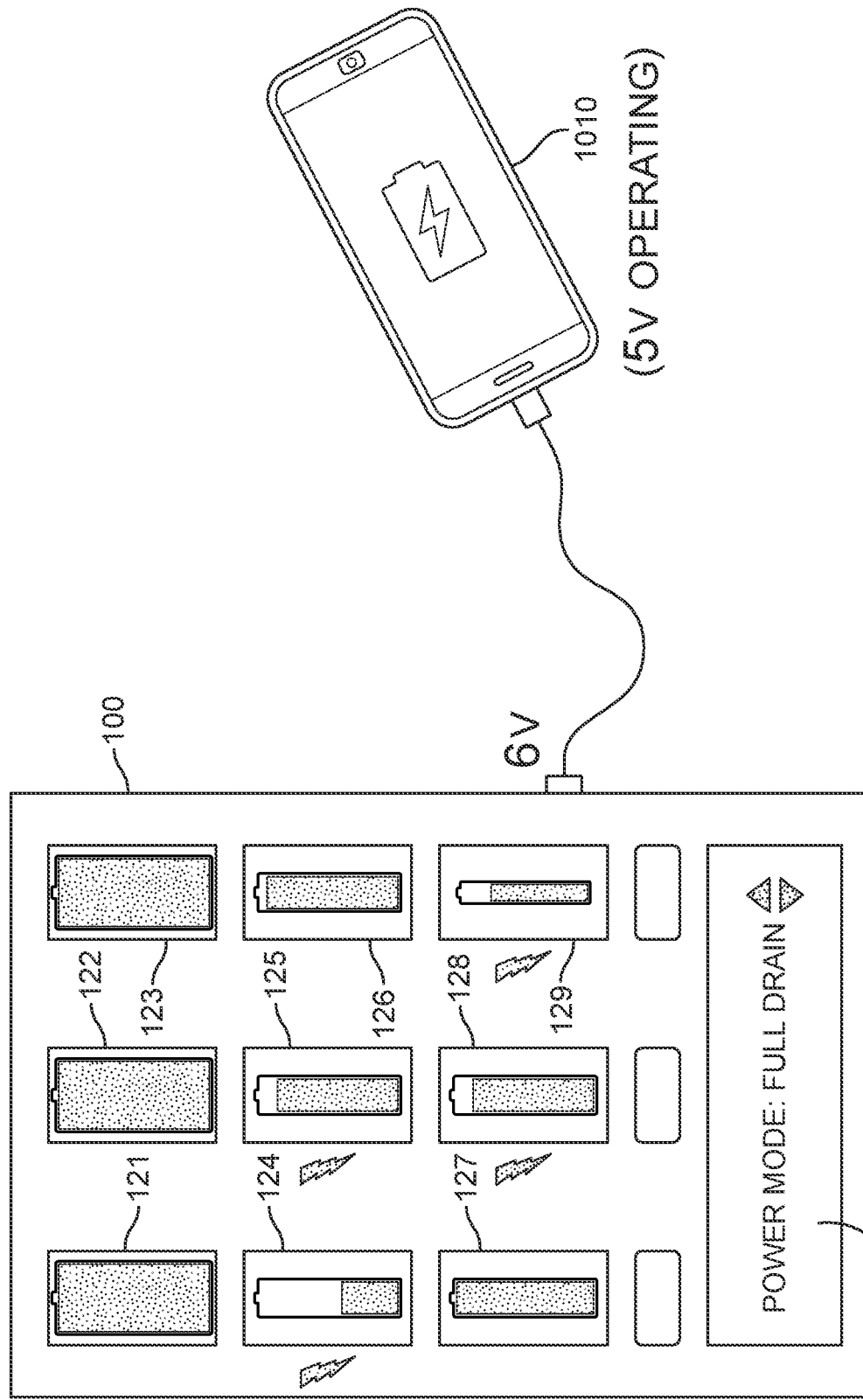
FIGS. 10-13 are schematic views of a power supplying device in different power delivery configurations, according to an embodiment.

FIG. 10 is a schematic view of power supplying device 100 with nine batteries inserted within the nine plurality of adjustable battery compartments. The battery compartments comprise first adjustable battery compartment 121 ("compartment 121"). The battery compartments further include compartment 122, compartment 123, compartment 124, compartment 125, compartment 126, compartment 126, compartment 127, compartment 128, and compartment 129.

As described, users of the device may be instructed to simply insert any batteries that have lying around that conform to one of the sizes accommodated by the power supplying device. The power supplying device can then intelligently control the delivery of power from one or more batteries to the connected power delivery ports. As seen in this example, the inserted batteries could comprise different battery types (with different form factors). In this example, a user has inserted one AAA battery (within compartment 129, five AA batteries (within compartment 124, compartment 125, compartment 126, compartment 127, and compartment 128) and three D batteries (within compartment 121, compartment 122, and compartment 123).

Additionally, the user has plugged in a cell phone 1010, which has a 5 Volt power requirement, into a power supply port of device 100. In a default configuration in which all the batteries are connected in serial and all switches to the battery compartments are left open, the output voltage would be a sum of the voltages of all the inserted batteries. In this case, the nominal total voltage supplied would be 13.5 V (that is, 1.5 V×9), which is significantly larger than the required 5 V for charging cell phone 1010.

In some cases, a step-down converter could be used to reduce the input battery voltage from 13.5 Volts to an output voltage of 5 Volts. Alternatively, in some embodiments, by adjusting the switches for the battery compartments so that only four batteries are used for powering the connected device, the output voltage would be approximately 6 V (that is, 1.5 V×4). This may be within the operating range of cell phone 1010, so that no further modification to the delivered power is needed. Alternatively, in some cases, the voltage could be further stepped down from 6 V to 5 V using a built-in step-down voltage converter.

By actively disconnecting some batteries from the power delivery port(s), the embodiments provide control over how power is discharged from each of the batteries. This allows the system to optimize battery discharge according to different user preferences. For example, consider a situation where a user inserts nine brand new batteries into a power supplying device. If power is drawn equally from all the batteries and the total voltage stepped down to meeting the voltage requirements of the powered device(s), the user may be left with nine partially drained batteries. By contrast, using the exemplary system, power may be primary drained from a subset of batteries, keeping the remaining batteries at full capacity, and therefore more useful to the user at a later time.

The specific subset of batteries that are used to power the connected device can be determined based on the optimal power configuration determined by power optimization module 716. In this example, the power mode is set to "Full Drain," as seen on display 150. The Full Drain mode may be one where the batteries with the greatest drainage (that is, batteries with the lowest capacity relative to their full capacity) are used first. This helps preserve the capacity of batteries that are not needed so that they can be used with other devices for their maximum lifetime once the emergency has passed.

The capacity of a battery can be determined using any suitable methods known in the art. In some cases, the capacity can be approximated using voltage as a proxy. Thus, by detecting the voltage output by a battery, a system can determine an approximate capacity, if the nominal voltage of the battery at full capacity is known.

For purposes of illustration, batteries connected to the circuit that delivers power to an output port are indicated with a charging icon (such as charging icon 1050). Disconnected batteries are those without charging icons. Here, connecting and disconnecting batteries is done by adjusting the on/off positions of the associated switches. In addition, the relative capacity of each battery is indicated with shading. For example, all of the C batteries (in compartment 121, compartment 122, and compartment 123), as well as the AA battery in compartment 127 are shown as having full capacity, while all the other batteries are shown with some partial capacity.

In this example, to accommodate the selected Full Drain mode, the optimal power configuration determined by the system is one where the four batteries with the lowest relative capacity are connected to the powering circuit (shown by the charge icons), while the remaining batteries are left disconnected. Specifically, the batteries in compartment 124, compartment 125, compartment 128, and compartment 129 are connected, while the remaining batteries/compartments are disconnected. Connecting four of the nine batteries provides 6 Volts to power cell phone 1010.

Figure 11:
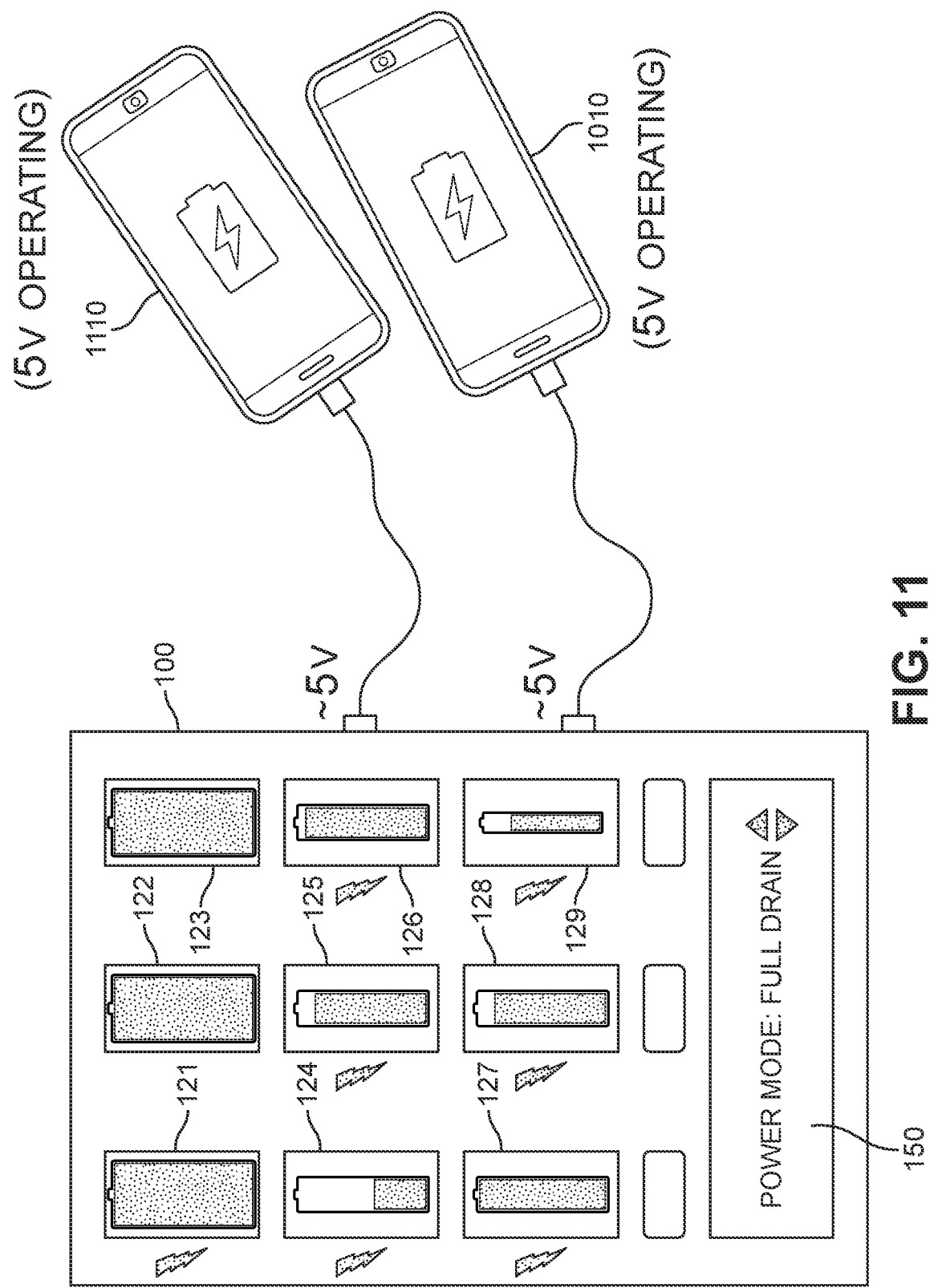

As seen in FIG. 11, if a second cell phone 1110 is plugged in to be charged simultaneously with cell phone 1010, the power configuration is automatically adapted to open switches to seven batteries. Together, the seven batteries provide 10.5 V (that is, 1.5 V×7), which can be divided between two ports providing approximately 5 Volts each for powering the respective cell phones. Again, the system does not connect batteries with full capacity whenever there are other batteries with less capacity available, when operating in Full Drain mode.

Figure 12:
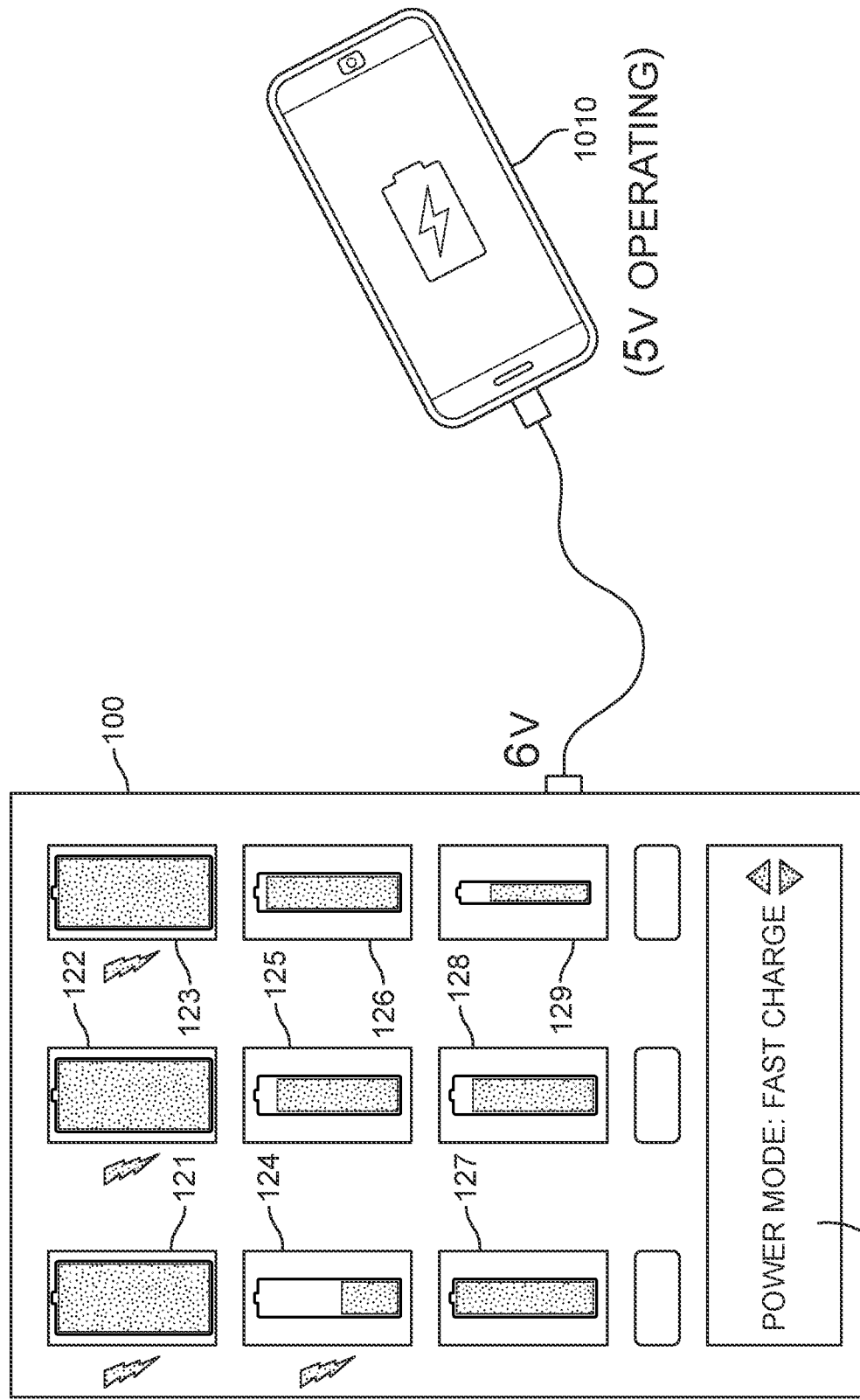

FIG. 12 depicts a power configuration for a "Fast Charging" mode. Generally, power may be drawn more quickly from batteries with a larger current capacity. Thus, while the current draw from batteries depends on the load and may not be fixed, with similar loads, a larger capacity battery such as a D battery will tend to supply a higher typical amperage for charging a cell phone than a smaller capacity battery such as a AAA battery. This will generally result in faster charging for a device. Therefore, in the Fast Charging mode, the selected power configuration is one that connects the three D batteries (in compartment 121, compartment 122, and compartment 123) to the powering circuit first, and also uses the AA battery with the lowest capacity (in compartment 124) to achieve a supply voltage (6 Volts) that is greater than the required 5 Volts.

Other power optimization modes could include a Cost Savings mode. In a Cost Savings mode, the power supplying device could identify the battery types present within each battery compartment and then rank the batteries according to cost, or cost per unit of power. The device could then select the cheapest batteries (or batteries with the cheapest cost per unit power) to draw power from first.

Figure 13:
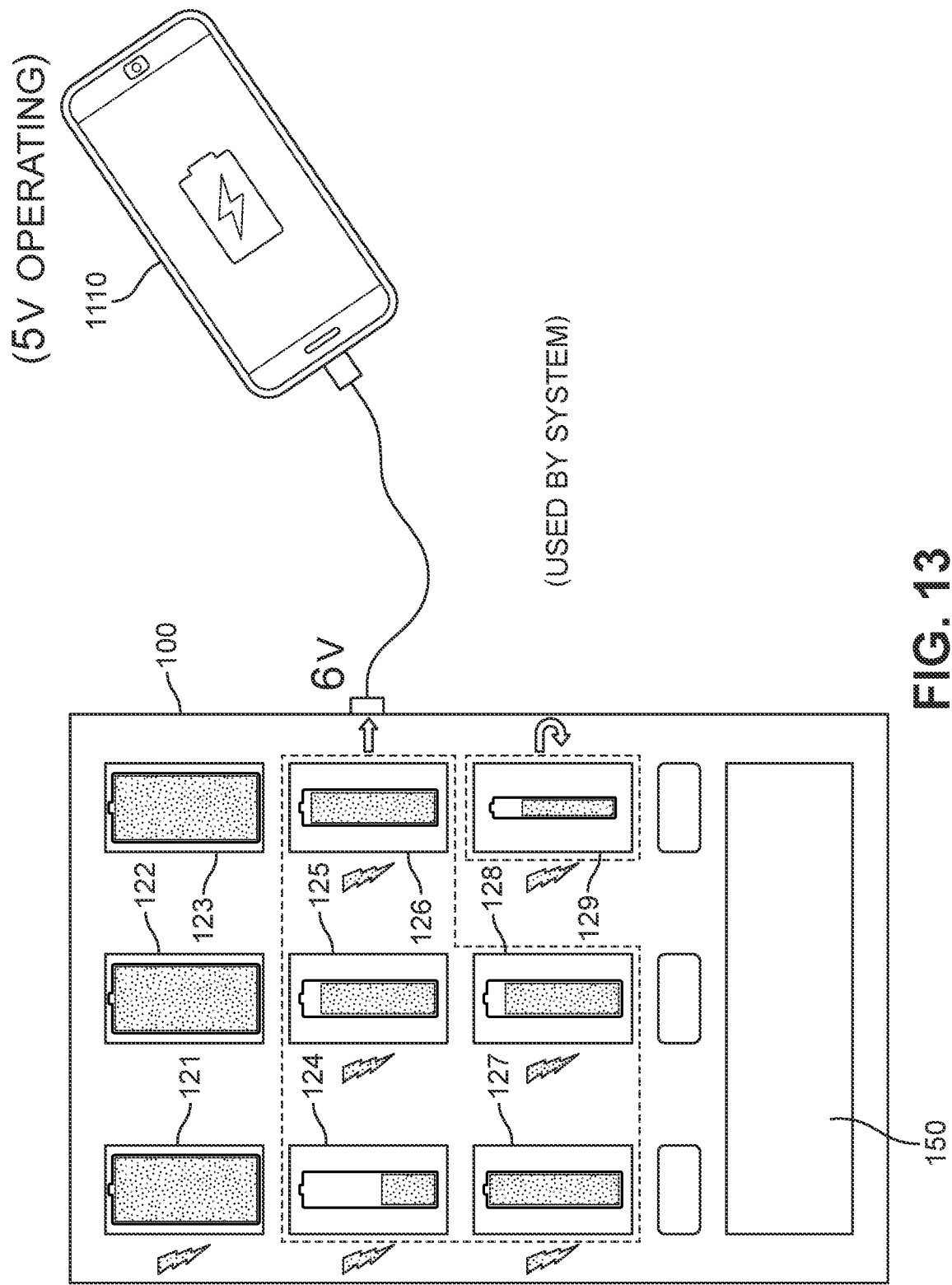

A power supplying device can include provisions for delivering power to its own internal components, such as the display, and various other modules that utilize power. As an example, in FIG. 13, device 100 uses four AA batteries to provide sufficient voltage for a cell phone 1302. In addition, device 100 uses the one AAA battery within compartment 129 for powering internal components. In particular, since internal components of device 100 may generally operate on relatively low currents, device 100 can select the battery providing the lowest current (in this case the AAA battery) for internal power.

It may be appreciated that as the capacity of a battery is drained over time, the operating voltage may drop. Therefore, the exemplary system can select a subset of batteries to provide sufficient voltage according to the measured voltages of each battery, rather than simply the nominal voltage of 1.5 Volts (for AAA, AA, C, and D batteries). Moreover, as the total available voltage changes, the system can modify the power delivery configuration in real time to ensure the operating voltage is sufficient for powering the connected device.

Figure 14:
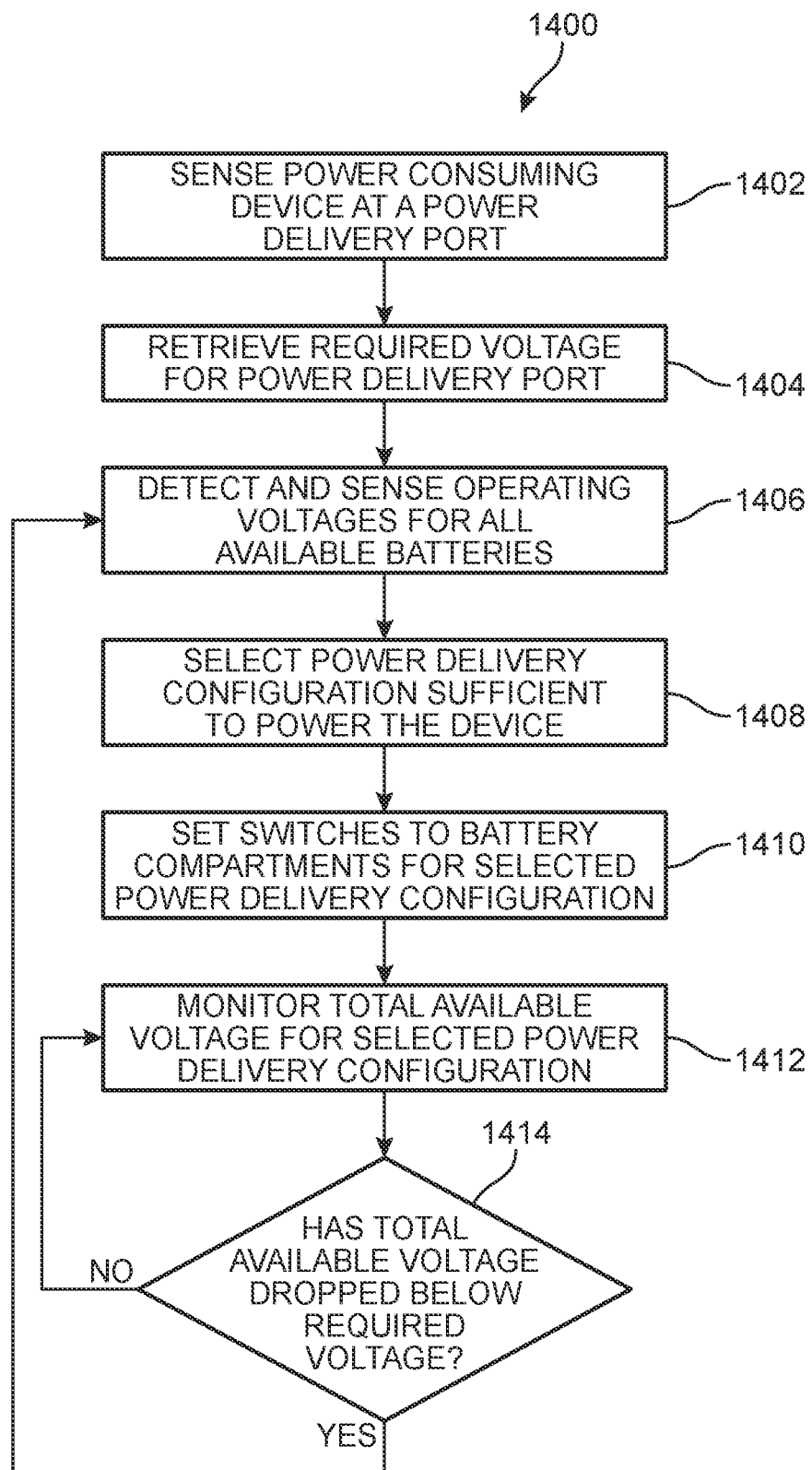
FIG. 14 is a schematic view of a process for maintaining sufficient voltage using a power supplying device, according to an embodiment.

FIG. 14 is a schematic view of a process 1400 for updating the power delivery configuration as the total available voltage provided by a given subset of batteries in a power supplying device is decreased below a required voltage from one or more power consuming devices. In some embodiments, one or more of the following steps could be performed by an intelligent power management system (such as system 600) of a power supplying device (such as device 100).

Starting in step 1402, system 600 could sense that there is a power consuming device connected to a power delivery port of the power supplying device. Next, in step 1404, system 600 could retrieve, from memory, the required voltage for the connected power delivery port (for example, if the power consuming device is connected to a standard USB port, system 600 may retrieve a value of 5 Volts for the voltage requirement).

Next, in step 1406, system 600 can detect the presence of, and sense the operating voltages of, all available batteries within the power supplying device. In some cases, this may include first closing all electrical switches so that all inserted batteries are connected to the power circuit. In some cases, the presence and operating voltage of each battery can be detected using a volt-metering sensor at each compartment.

In step 1408, system 600 selects a power delivery configuration sufficient to power the device, according to the processes discussed above. In step 1410, system 600 can set the switches for each battery compartment to an on or off position to achieve the selected power delivery configuration.

In step 1412, system 600 can monitor the total available voltage for the subset of selected batteries that are connected to the power delivery port in the selected power delivery configuration. In step 1414, system 600 checks to see if the available voltage has dropped below the required voltage of the power delivery port (and, by proxy, the power consuming device). If not, system 600 returns to step 1412 to continue monitoring the total available voltage for the connected batteries.

If in step 1414, system 600 detects that the available voltage has dropped below the required voltage, system 600 returns to step 1406. At step 1406, system 600 can determine the current operating voltages of all available batteries, and then proceed to update the power delivery configuration such that the subset of connected batteries in the new power delivery configuration will provide at least the required voltage.

Figure 15:
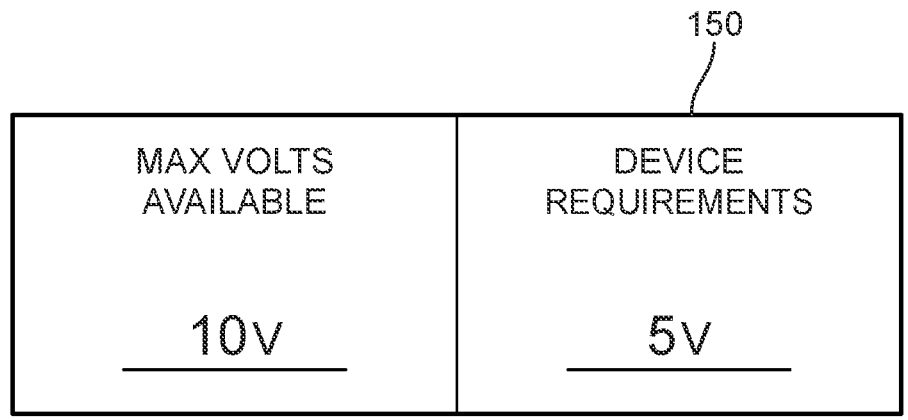
FIGS. 15-16 are schematic views of a power supplying device displaying information for a user.

As discussed, a power supplying device could display information for a user. As an example, in FIG. 15, display 150 shows information including the maximum voltage available from all connected batteries and the required voltage for powering a connected device.

Figure 16:
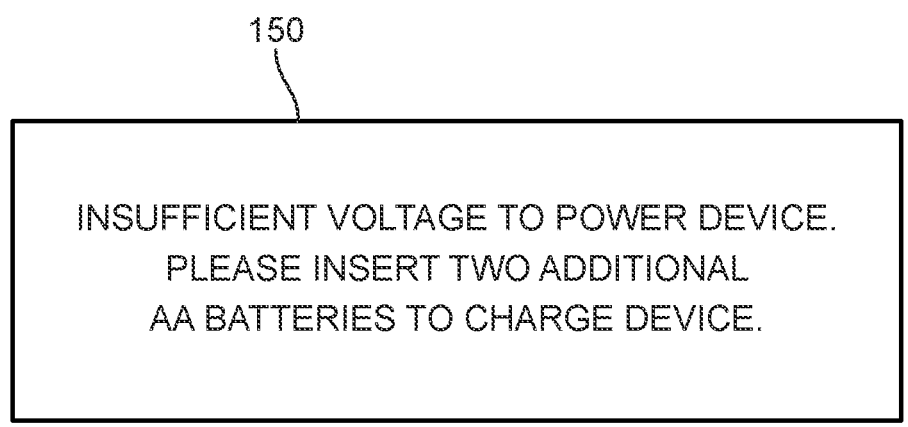

In some cases, a power supplying device could prompt a user to add (or replace) batteries to provide sufficient power for the connected device(s). As an example, in FIG. 16, display 150 shows a message prompting the user to add two additional AA batteries in order to provide sufficient voltage in charging the connected device. Alternatively, the message could request that the user inserts two additional batteries of any of the AAA, AA, C, and D sizes. To generate this message, the system can first check for the power requirements of any connected power delivery reports and also check the current operating voltage of all inserted batteries. If the operating voltage is below the required voltage, then the system could calculate an additional number of Volts needed, and select the number of additional batteries required to meet that voltage, assuming the inserted batteries provide the nominal 1.5 V.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. Examples of media that can be used for storage include erasable programmable read-only memory (EPROM), electrically erasable programmable read-only memories (EEPROM), solid state drives, magnetic disks or tapes, optical disks, CD ROM disks and DVD-ROM disks.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

For each of the exemplary processes described above including multiple steps, it may be understood that other embodiments some steps may be omitted and/or reordered. In some other embodiments, additional steps could also be possible.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. A power supplying device comprising:
a plurality of adjustable battery compartments, wherein each adjustable battery compartment includes a first lead having a fixed location within the adjustable battery compartment and a second lead having an adjustable location within the battery compartment, wherein each adjustable battery compartment can accommodate at least two different battery sizes;
a power delivery port configured to receive power from one or more batteries placed in the plurality of battery adjustable compartments, wherein the power delivery port has a standard operating voltage;
wherein each battery compartment in the plurality of adjustable battery compartments includes a corresponding battery compartment switch that can be used to connect and disconnect the leads of the adjustable battery compartments with the power delivery port; and
an intelligent power management system configured to:
determine that a power consuming device is connected to the power delivery port;
sense any batteries in the plurality of adjustable battery compartments, including an available voltage for each sensed battery;
select a subset of batteries in the plurality of adjustable battery compartments with a combined voltage at least as large as the standard operating voltage of the power delivery port; and
connect, using the corresponding battery compartment switch for each battery compartment, the selected subset of batteries to the power delivery port and disconnect any other batteries compartments.

2. The power supplying device according to claim 1, wherein the intelligent power management system is further configured to:
retrieve power requirement information for the power supplying device, wherein the power requirement information includes at least an device operating voltage for the intelligent power management system; and
select a subset of batteries in the plurality of battery compartments with a combined voltage at least as large as the sum of the standard operating voltage of the power delivery port and the device operating voltage of the intelligent power management system.

3. The power supplying device according to claim 1, wherein the power supplying device includes a display screen, and wherein the display screen can indicate a maximum voltage available from the one or more batteries.

4. The power supplying device according to claim 3, wherein the intelligent power management system can detect when the maximum available voltage is less than the standard operating voltage of the power delivery port, and display a message indicating that additional batteries are required.

5. The power supplying device according to claim 1, wherein the intelligent power management system selects the subset of batteries using at least information about a measured operating voltage for each battery disposed within the plurality of adjustable battery compartments.

6. The power supplying device according to claim 1, wherein the intelligent power management system selects the subset of batteries using at least information about a battery type of each battery disposed within the plurality of adjustable battery compartments.

7. A method for a power supplying device comprising a power delivery port and a plurality of adjustable battery compartments with switches for connecting the plurality of adjustable battery compartments with the power delivery port, the method comprising:
determining that a power consuming device is connected to the power delivery port;
sensing any batteries in the plurality of adjustable battery compartments, including an available voltage for each sensed battery;
selecting a subset of batteries in the plurality of adjustable battery compartments with a combined voltage at least as large as a standard operating voltage of the power delivery port; and
connecting, using the corresponding battery compartment switches for the plurality of adjustable battery compartments, the selected subset of batteries to the power delivery port and disconnect any other batteries compartments.

8. The method according to claim 7, the method further comprising:
retrieving power requirement information for the power supplying device, wherein the power requirement information includes at least a device operating voltage; and
selecting a subset of batteries in the plurality of battery compartments with a combined voltage at least as large as the sum of the standard operating voltage of the power delivery port and the device operating voltage.

9. The method according to claim 7, wherein the power supplying device includes a display screen, and wherein the method further includes displaying, with the display screen, a maximum voltage available from the batteries in the plurality of adjustable battery compartments.

* * * * *